United States Patent

Walker

Patent Number: 5,557,883
Date of Patent: Sep. 24, 1996

[54] TRELLISING SYSTEM FOR PRODUCING DRIED-ON-THE-VINE RAISINS

[75] Inventor: David L. Walker, Caruthers, Calif.

[73] Assignee: Sun-Maid Growers of California, Kingsburg, Calif.

[21] Appl. No.: 384,282

[22] Filed: Feb. 1, 1995

[51] Int. Cl.⁶ .......................... A01G 17/06; A01G 17/14
[52] U.S. Cl. ....................................... 47/46; 47/47
[58] Field of Search ................... 47/46 R, 47 R, 47/47 L

[56] References Cited

U.S. PATENT DOCUMENTS

| | | | |
|---|---|---|---|
| 941,894 | 11/1909 | Stetson | 47/46 R |
| 1,227,105 | 5/1917 | Barnes | 47/47 R |
| 3,690,033 | 9/1972 | Lewis et al. | 47/46 R |
| 4,625,454 | 12/1986 | Daniell | 47/46 R |
| 4,738,051 | 4/1988 | Dyson | 47/46 R |
| 5,144,768 | 9/1992 | Hiyama et al. | |
| 5,411,561 | 5/1995 | Conley | 47/46 R |

FOREIGN PATENT DOCUMENTS

| | | | |
|---|---|---|---|
| 543803 | 11/1921 | France | 47/46 R |
| 1094519 | 12/1960 | Germany | 47/46 R |
| 224156 | 6/1942 | Switzerland | 47/46 R |
| 0852253 | 8/1981 | U.S.S.R. | 47/46 R |
| 1702946 | 1/1992 | U.S.S.R. | 47/46 R |

OTHER PUBLICATIONS

"Growth of the Sultana Vine on Irymple Trellis," FIG. 3.
"Mechanical Harvesting of Black Corinth Raisins," P. Christensen, C. Lynn, H. P. Olmo, H. E. Studer, *California Agriculture*, Oct. 1970, pp. 4–6.
"Mechanization of Raisin Production with the Irymple Trellis Systems," I. V. Gould, J. R. Whiting, *Transaction of the ASAE*, Jan.–Feb. 1987, pp. 56–60.
Department of Agriculture Technical Report Series No. 193, "The Shaw Trellis—A New Innovation in Trellis Dried Sultana Production," R. Hayes, R. Johns, M. Mollah, pp. 1–55, undated.

*Primary Examiner*—Terry Lee Melius
*Assistant Examiner*—Joanne C. Downs
*Attorney, Agent, or Firm*—Townsend and Townsend and Crew LLP

[57] ABSTRACT

A trellis system (164) is used to produce dried-on-the-vine raisins in a row (2) of vines (4) having a split canopy of fruiting canes (26) and replacement canes (28). The fruiting canes are supported by bent metal posts (150) each having an upwardly inclined support arm (156). The inclined support arms support one or more wires (138, 140) which support the fruiting canes so that, after the fruiting canes are severed, the grapes can dry from the heat of the sun to create raisins. The replacement canes are supported away from the fruiting canes by a trellising arrangment (100) having wires (142, 144) supported by replacement cane support arms (106) mounted to posts (102).

15 Claims, 6 Drawing Sheets

TRELLISING SYSTEM FOR PRODUCING DRIED-ON-THE-VINE RAISINS

BACKGROUND OF THE INVENTION

California is the leading producer of raisins in the United States. About 97% of all California raisins are from the variety Thompson seedless, also called Sultana in Australia and Europe. There are three main methods by which raisins are produced in California. One method is to dip the grapes into a caustic soda and water solution followed by exposure to sulphur/$CO_2$ and then dried in a dehydrator to create golden colored raisins. These raisins have a certain following and are distinguished by their golden color and their slightly sulfur taste. A second type of raisin made in California is by a hot water dipped process. In this process green grapes are dipped in a hot water solution which not only slightly splits the skins to promote subsequent drying but also causes the resulting raisin to have a darkish (brown) color and a taste vaguely reminiscent of chocolate. By far the most prevalent type of raisins sold in the United States is the natural Thompson seedless (NTS) raisin. NTS raisins are dried in the sun. In this sun drying process, green grapes are picked when sufficiently ripe, typically about 21° Brix, and placed on drying trays or strips of paper. The drying trays or paper strips are placed on dirt mounded or terraced between the rows of vines. It usually takes about 3 weeks to sun-dry raisins in the Central Valley of California. This produces the conventional dark-colored, NTS raisin in a simple and cost-effective manner. One of the problems with dried-on-the-ground type raisins is the chance of rain during the drying season. If rained on, dried-on-the-ground raisins are susceptible to mold, infestation, rot and may be ruined. Also, especially under more humid conditions, these raisins might be attacked by certain molds or mildew which would ruin them for human consumption. Another problem with dried-on-the-ground raisins is the cost associated with picking the grapes, placing the trays on the dirt mounds formed between the rows, and gathering the raisins when dried.

Efforts to mechanically harvest green grapes and automatically deposit them onto strips of drying paper between the rows have been made. Because of the violence with which grapes are mechanically harvested (the grapes are beaten or shaken off their vines), a certain amount of damage and stickiness to the grapes occurs. While this is not a problem if the grapes are immediately crushed, such as occurs when making wine, leaving damaged grapes on drying trays on the ground for a number of weeks may create lower quality raisins and could result in the growth of molds and mildew as well as promote insect damage.

Other parts of the world, such as Australia, do not produce substantial amounts of natural raisins. Rather, the green grapes, when mature, are sprayed with an oil emulsion, typically 2% aqueous solution of methyl oleate and potassium carbonate. This creates tiny cracks in the skin to aid drying of the raisins and produce a lighter color raisin. The sprayed grapes are generally dried in large drying racks using chicken wire.

There is an Australian system for producing dried-on-the-vine raisins using what is called an Irymple trellis system. In that system divided canopies are created along the row of grape vines. To create divided canopies, the fruiting canes are supported on horizontal trellis systems along one side of the row while the replacement canes are supported on an inclined trellis system on the other side of the row. The fruit develops from the fruiting canes and hangs freely below the leaf canopy beneath the fruiting canes. When the fruit is mature, the grape bunches are sprayed with an oil emulsion, such as methyl oleate, and the fruiting canes are cut to speed drying of the grapes. It has been found that cutting the fruiting canes at this time, so long as one limits the number of canes cut to no more than about 50% of the total canopy, does not injure the vine, which would reduce the next year's harvest.

SUMMARY OF THE INVENTION

The present invention is directed to a trellis system for producing dried-on-the-vine (DOV) raisins in a row of vines having a split canopy of fruiting canes and replacement canes. The trellis system includes a plurality of inclined support arms, each having an outer end at a substantially greater elevation than an inner end. Each inclined support arm is mounted along the row by a corresponding vertical post. In one embodiment, the support arm is mounted to the post so that the inner and outer ends of the inclined support arm lie on opposite sides of the post. In this embodiment, a wire connects the inner end of the inclined support arm to the lower end of the post. Instead of securing the support arms to separate posts, the support arms could be made from, for example, a dog-leg shaped bent metal post (studded T post) having a vertical portion driven into the ground and an upwardly and outwardly angled portion serving as the support arm. The inclined support arms support one or more wires near their outer ends; the wires support the fruiting canes so that, after the fruiting canes are severed, the grapes can dry from the heat of the sun to create raisins.

The trellis system also includes a plurality of replacement cane support arms each mounted to the upper end of a corresponding vertical post at a higher elevation than the inclined support arms. The replacement cane support arms support one or more wires which, in turn, support the replacement canes to keep the replacement canes separated from the fruiting canes.

One of the primary advantages of the invention is that the inclined support arms are each connected to a vertical support post at a position substantially lower than the outer end of the support arm; where the fruiting canes are supported. Therefore, the center of gravity of the grapes supported by each post is lowered (when contrasted with horizontal support posts) so the stress on the post and the trellis system is reduced.

Another advantage of the invention is that shorter posts can be used to support the inclined support arms along the row of vines, thereby reducing the overall cost of the trellis system. Typically, the fruiting canes require more support than the replacement canes. Therefore, more inclined support arms than replacement cane support arms are needed in each row of vines. In one embodiment, for example, the inclined support arms are placed at every third vine and the replacement cane support arms are placed at every ninth vine. Therefore, at vines where only the inclined support arms are placed, the post needs to be only as high as the inner end of the inclined support arm, which is substantially lower than the outer end. In the alternative embodiment, the inclined support arms are not mounted to the vertical posts. Therefore, the vertical posts are only placed where the replacement cane support arms are needed.

Both types of trellis structures can be used in the same row if desired. In this case, an inclined support arm can be mounted, typically, midway along the support post for the replacement canes and the one-piece, bent metal embodiment can be used between the replacement cane support posts.

The present invention has the additional advantage of drying the grapes on the vine to create the raisins. Doing so substantially eliminates the possibility of rain damage since hanging bunches, as opposed to grapes lying on drying trays on the ground, dry out quickly after a rain. The raisins produced are preferably natural raisins, without any chemical solutions applied to the grapes, so the cost associated with such chemical solutions, and the accompanying negative physiological effects on the vine, are eliminated. Also, the overall labor costs are substantially reduced with the present invention, particularly because the raisins can be mechanically harvested.

Other features and advantages of the invention will appear from this following description in which the preferred embodiments have been set forth in detail in conjunction with the accompanying drawings.

DESCRIPTION OF THE PREFERRED EMBODIMENT

The invention finds its greatest utility when used to produce natural DOV raisins. Therefore, a DOV raisin-producing method will be discussed with reference to FIGS. 1–3 prior to describing the invention of FIGS. 4 and 5.

Figure 1:
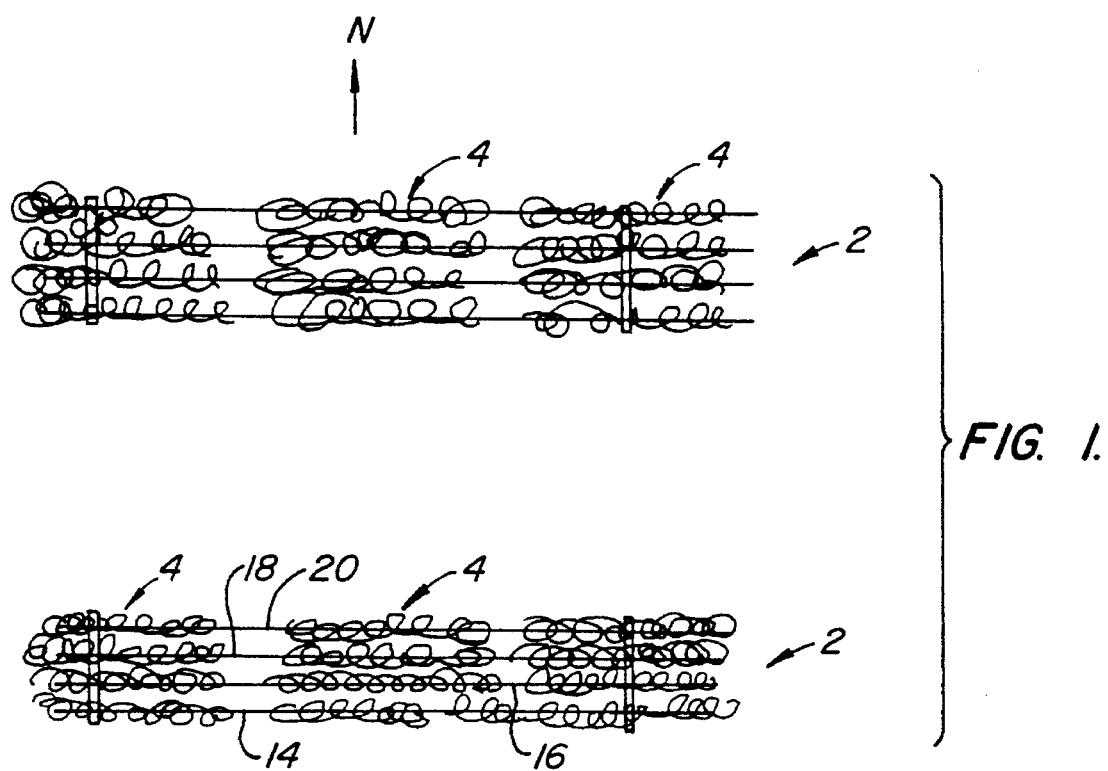
FIG. 1 is a plan view of a section of a vineyard showing two rows of east/west oriented grape vines with the vines trellised in a divided canopy arrangement.
Figure 2:
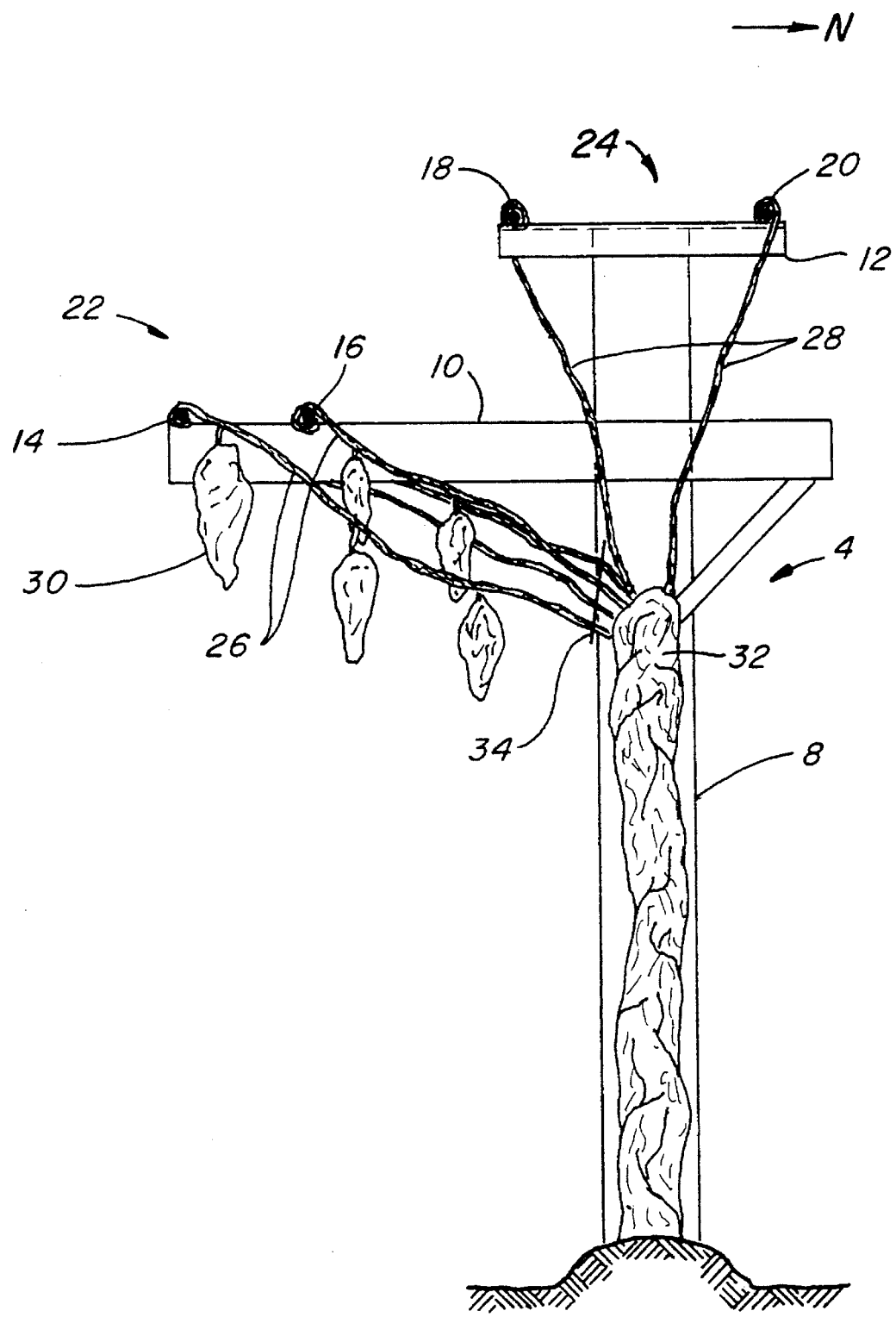
FIG. 2 is an enlarged end view taken along line 2—2 of FIG. 1 illustrating the training of the fruiting and replacement canes onto the fruiting cane and replacement cane catching trellised but with the foliage omitted for clarity.
Figure 3:
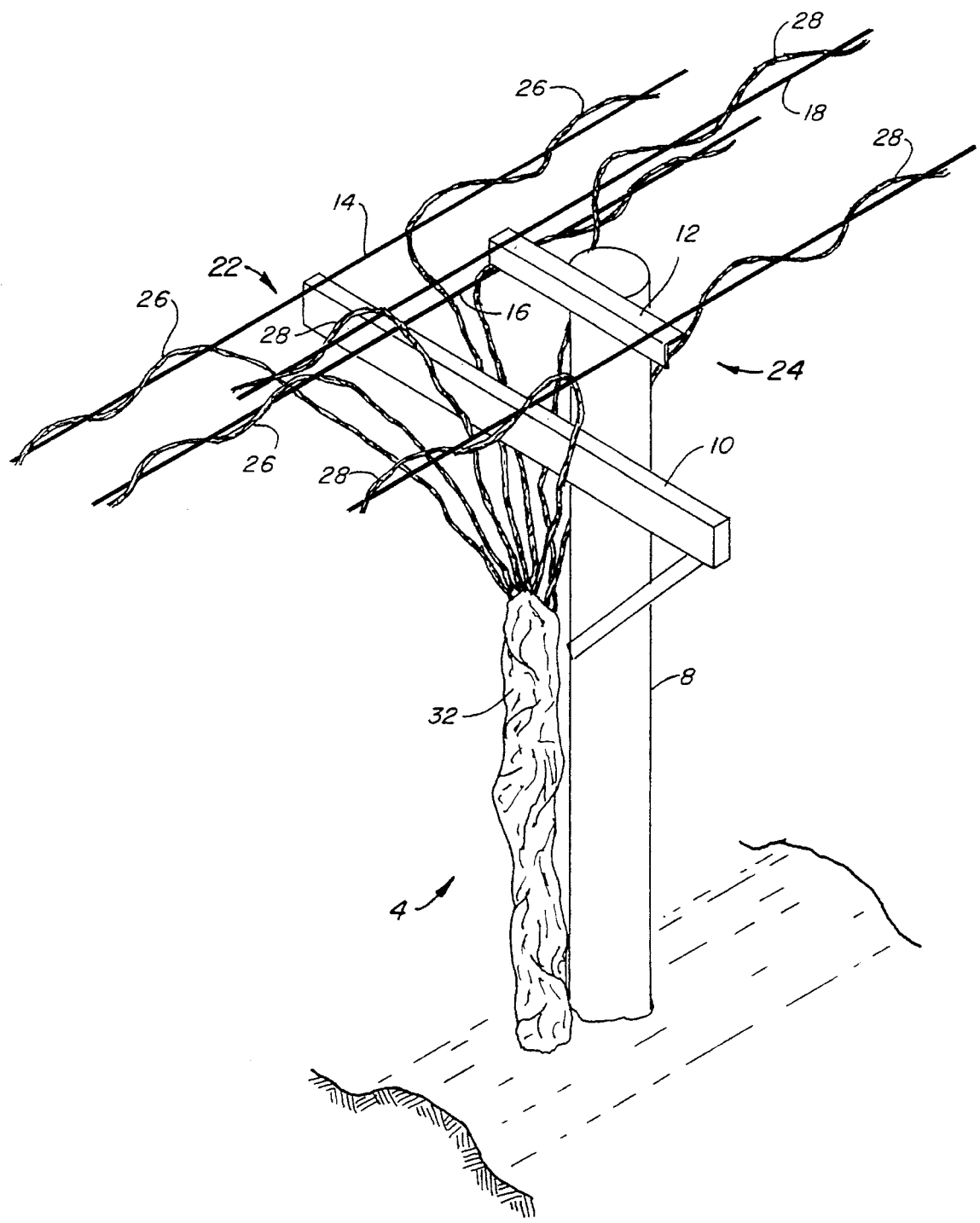
FIG. 3 is a perspective view of the grape vine, post and catching trellises of FIG. 2.

FIG. 1 illustrates rows 2 of grape vines 4. As suggested in FIG. 1, rows 2 are oriented in east/west rows, as is conventional, with the spacing between grape vines 4 about seven or eight feet and the distance between rows 2 about 12 feet. As illustrated in FIGS. 2 and 3, trellis system 6 includes a series of common posts 8 to which an offset cross arm 10 and a centered cross arm 12 are mounted. Offset cross arm 10 supports a pair of wires 14, 16 while centered cross arm 12 supports a pair of wires 18, 20. As shown in the figures, wires 14, 16 are on one side, typically the south side, of row 2 of grape vines 4. Common post 8, cross arm 10 and wires 14, 16 constitute a fruiting cane catching trellis 22 while common post 8, cross arm 12 and wires 18, 20 constitute a replacement cane catching trellis 24. Fruiting canes 26 are trained to wires 14, 16 while replacement canes 28 are trained to wires 18, 20. Note that in FIGS. 2 and 3, the foliage is not shown for sake of clarity while the grape bunches 30 are also not shown in FIG. 3.

The procedure for growing grape vines 4 and making the resulting raisins proceeds generally as follows. After each harvest, the old fruiting canes 26 are removed and the old replacement canes 28 are trimmed and moved from trellis 24 to trellis 22 to act as the next fruiting canes. During the next spring when the new growth starts from crown 32 of grape vine 4, several replacement canes are selected from the new growth and are guided onto wires 18, 20. The prior year's replacement canes 28 thus become the present year's fruiting canes 26 while new growth is selected as the new replacement canes 28 are trained onto wires 18, 20.

At the end of the growing season after the appropriate degree of maturity of the grapes is achieved, typically around 21° Brix for Thompson seedless grapes, the fruit hanging from fruiting canes 26 is substantially free from overhanging foliage of replacement canes 28. To permit the grapes to dry on the vines, fruiting canes 26 are cut adjacent crown 32 as indicated at 34. This permits foliage associated with fruiting canes 26 to dry and shrivel thus allowing more light and air to circulate among the hanging grapes. After grape bunches 30 are sufficiently dry, they are harvested by hand or, preferably, using a mechanical grape/raisin harvester.

Figure 4:
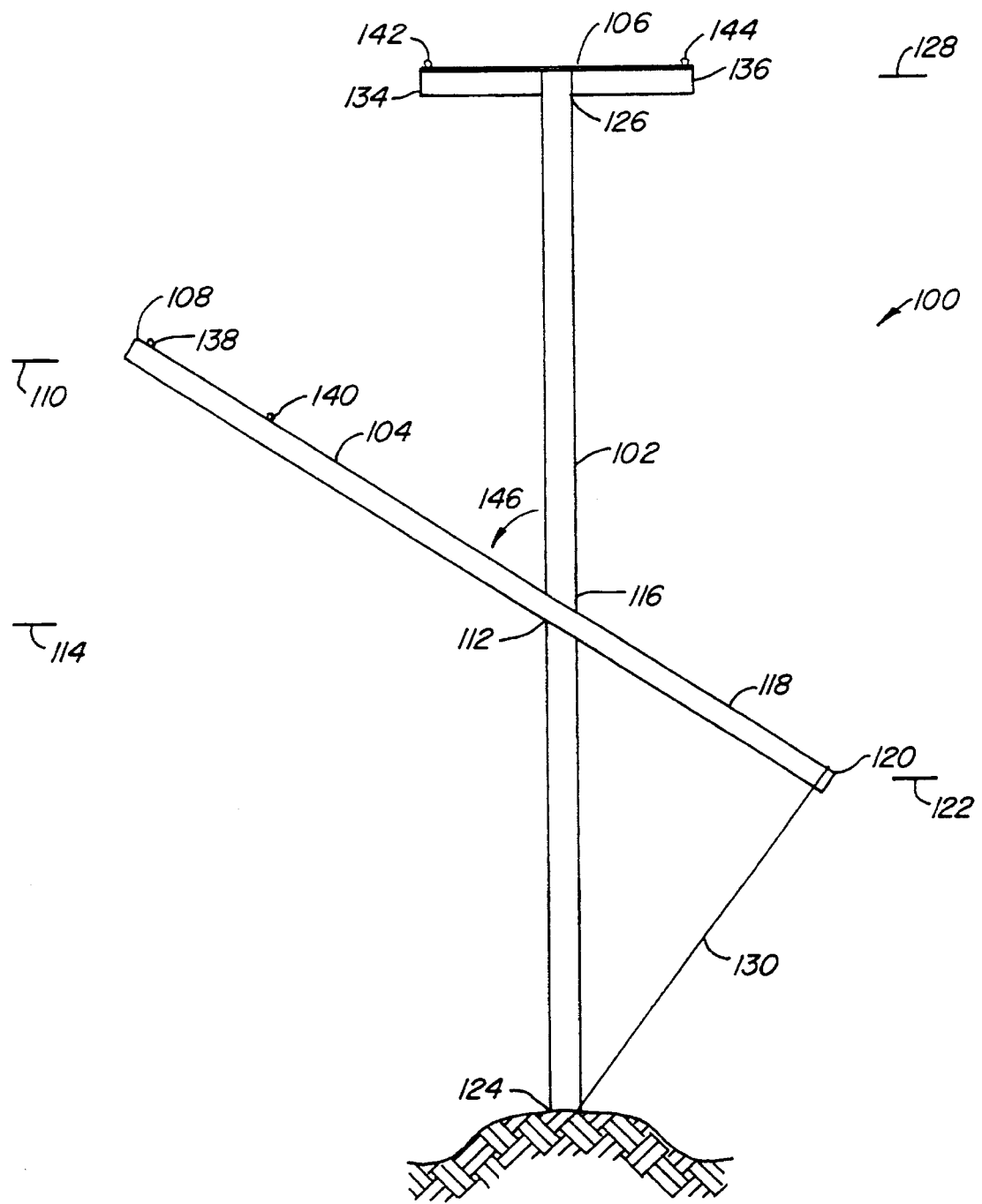
FIG. 4 illustrates an alternative trellising arrangement with an inclined support arm, mounted to a vertical post, for supporting the fruiting canes.

FIG. 4 illustrates a trellising arrangement 100 made according to the invention including a vertical post 102 to which an inclined support arm 104 and a replacement cane support arm 106 are mounted. Inclined arm 104 has an outer end 108 with an upper elevation 110 and an inner end 112 with a lower elevation 114. Upper elevation 110 is substantially higher than lower elevation 114. However, the invention is not limited to this arrangement as will be discussed below. Inner end 112 is aligned with rows 2 of grape vines 4 and is mounted to a connection position 116 on vertical post 102. Inclined arm 104 has an extension 118 extending from inner end 112 to an extended end 120 having an elevation 122 lower than lower elevation 114.

Vertical post 102 has a lower end 124 mounted into the ground and an upper end 126 with an elevation 128 higher than upper elevation 110 of outer end 108. Wire 130 connects extended end 120 of inclined arm 104 to lower end 124 of vertical post 102. Wire 130 counters the moment produced by the fruiting canes and grapes (not shown in FIG. 4) resting on inclined arm 104 so that connection position 116 of post 102 does not resist the entire moment of inclined arm 104.

Replacement cane arm 106 is mounted to upper end 126 of post 102 at elevation 128, which is higher than upper elevation 110 of outer end 108 so that the replacement canes are kept separate from the fruiting canes (neither shown in FIG. 4). Replacement cane arm 106 includes first and second ends 134, 136 on either side of post 102. Replacement cane arm 106 is centered on post 102 and oriented horizontally so that first and second ends 134, 136 are equidistant from post 102 at elevation 128. However, the invention is not limited to this configuration. For example, replacement cane arm 106 can be V-shaped so that first and second ends 134, 136 have a higher elevation than upper end 126 of post 102. Alternatively, only one side of replacement cane arm 106 can be inclined upwardly while the other side remains horizontal.

Trellising arrangement 100 is specially adapted for use with east/west running rows 2 of grape vines 4 (see FIG. 1). Inclined arm 104 supports a pair of wires 138, 140 while replacement cane arm 106 supports a pair of wires 142, 144. Wires 138, 140 are on the south side of row 2 of grape vines 4 near outer end 108 of inclined arm 104. Wires 142, 144 are on either side of row 2 of grapes vines 4 near first and second ends 134, 136 of replacement cane arm 106. The fruiting canes will be trained onto wires 138, 140 while the replacement canes will be trained to wires 142, 144 in the same manner as shown in FIG. 2. The replacement canes will remain separated from the fruiting canes because replacement cane arm 106 is higher than outer end 108 of inclined arm 104.

Inclined arm 104 is oriented at an angle 146 from vertical post 102 and connection position 116 is, typically, approximately halfway between upper end 126 and lower end 124 of post 102. However, the invention is not limited to the angle and connection position shown in FIG. 7. These two variables can be adjusted to minimize stress on post 102 and overall cost while ensuring that the fruiting canes are able to fully dry in the sun. For example, angle 146 and connection position 116 should be adjusted so that upper elevation 110 of outer end 108 is lower than elevation 128 of upper end 126 (to keep the replacement and fruiting canes separate) and extended end 120 of inclined arm 104 is above the ground (so that wire 130 will counter the weight of the grapes on inclined arm 104). In addition, a low connection position 116 will lower the center of gravity of the grapes supported by inclined arm 104 and, therefore, reduce the stress on post 102. A low connection position 116 will also reduce cost because the upper portion of post 102 (above connection position 116) is not used in every position along row 2 of vines 4, as will be discussed below.

On the other hand, upper elevation 110 of outer end 108 could be restricted by the height of the machine (not shown) that harvests the grapes from the fruiting canes.

Figure 5:
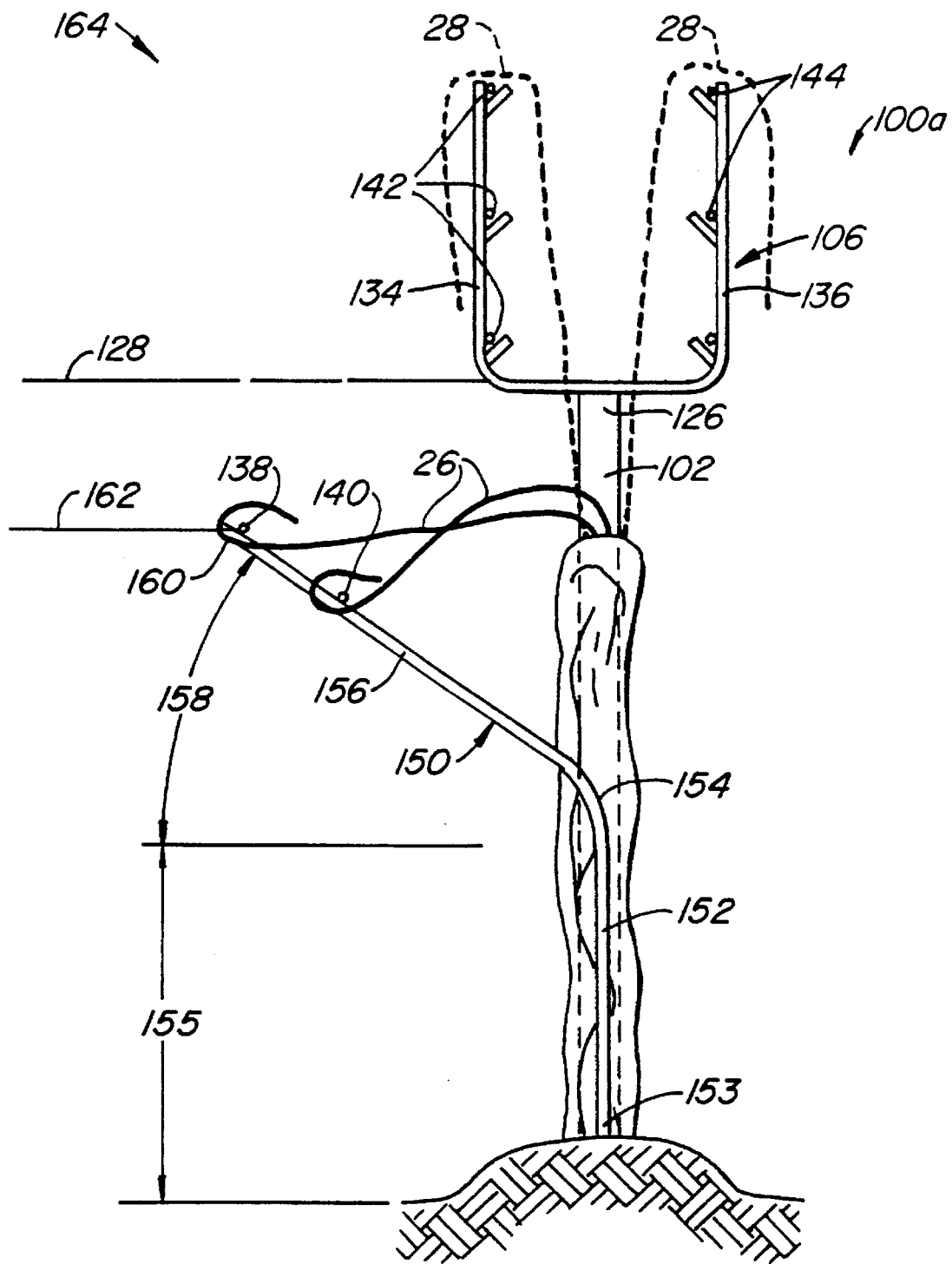
FIG. 5 illustrates a variation of the trellising arrangement of FIG. 4 with a bent metal post for supporting the fruiting canes.

FIG. 5 illustrates an alternative, and presently preferred, embodiment of trellising arrangement 100. Trellising arrangement 100a includes a bent metal post 150 having a vertical lower portion 152 with a lower end 153 driven into the ground, a curved middle portion 154 with a lower elevation 155, and an inclined upper portion or arm 156 extending upwardly and outwardly from middle portion 154. Inclined upper portion 156 has an angle 158 and an outer end 160 with an upper elevation 162. Angle 158 and upper elevation 162 (i.e., the height of lower portion 152) can be adjusted in the same manner as discussed above with trellising arrangement 100. Upper portion 156 of metal post 150 supports wires 138, 140 near outer end 160. The fruiting canes 26 are trained onto wires 138, 140.

Trellising arrangement 100a also includes a U-shaped or goal-post-shaped or lyre-shaped replacement cane arm 106 mounted to upper end 126 of vertical post 102 at elevation 128, which is higher than upper elevation 162 of outer end 160 (similar to trellising arrangement 100). This U-shaped support is commonly used to support wine-making grape vines but not to support raisin-making grape vines. Replacement cane arm 106 supports wires 142, 144 at its first and second sides 134, 136. The replacement canes 28 are trained onto wires 142, 144. Note that vertical post 102 is separate from metal post 150 so that the arm 156 that supports the fruiting canes is not mounted to post 102. Therefore, metal post 150 and post 102 do not have to be placed at the same position along row 2 of vines 4, as will be discussed below.

Figure 6:
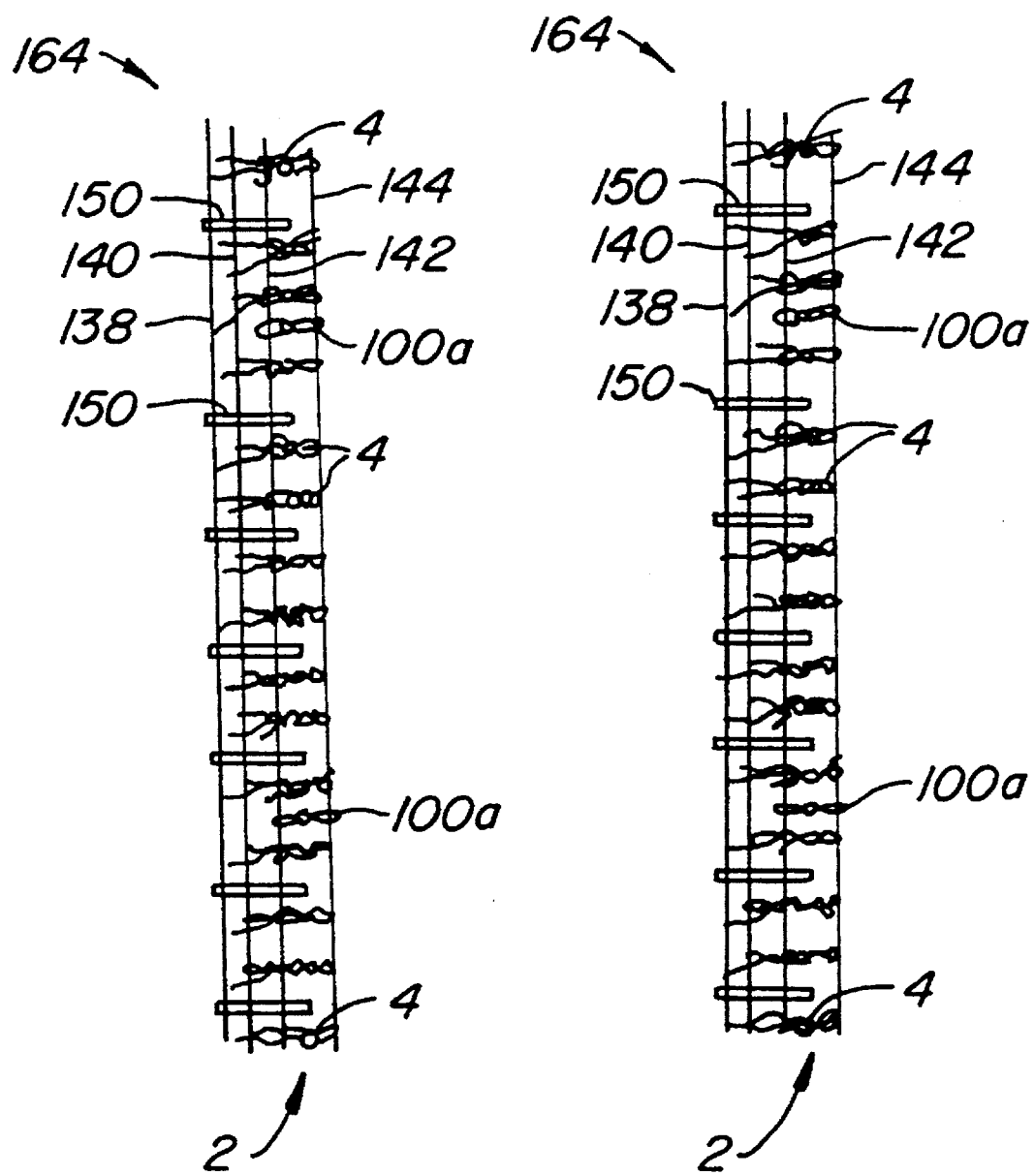
FIG. 6 illustrates a schematic plan/front view of a trellising system using the trellising arrangement of FIG. 5.

FIG. 6 illustrates two rows 2 of east/west oriented grape vines 4 with the vines 4 trellised by a trellising system 164. The fruiting canes require more support than the replacement canes. Therefore, bent metal posts 150 are preferably used at every second vine 4 and trellising arrangements 100a are used at every eighth vine 4. This arrangement reduces the overall cost of trellising system 164 because trellising arrangement 100a is not used in every position needed to support the fruiting canes.

The invention is not limited to the above arrangement. For example, it may be desired to provide more support for the fruiting and replacement canes. Therefore, the trellising arrangements 100a and bent metal posts 150 could be placed at closer intervals along row 2 of vines 4. Alternatively, a combination of bent metal posts 150 and trellising arrangements 100 and 100a can be used in the same row 2. In this case, trellising arrangements 100, with inclined and replacements arms 104, 106 mounted to vertical post 102, would preferably be used where support is needed for both the fruiting and replacement canes. On the other hand, bent metal post 150 would typically be positioned by themselves where support is needed only for the fruiting canes.

Other modifications and variations can be made through disclosed embodiments without departing from the subject of the invention as defined in the following claims.

What is claimed is:

1. A trellis system for producing dried-on-the-vine raisins in a row of vines of the type growing in the ground and having a split canopy of fruiting canes and replacement canes, the system comprising:

a plurality of first support arms each having outer and inner ends;

a plurality of second support arms each having first and second ends;

a plurality of substantially vertical first support members each having an upper end and a lower end, said upper ends secured to the first support arms supporting each said first support arm along the row of vines with the outer end having an upper elevation and the inner end having a lower elevation, the upper elevation being substantially greater than the lower elevation;

a plurality of substantially vertical second support members secured to the second support arms supporting each said second support arm along the row of vines with the first and second ends both having elevations higher than the upper elevation;

a first wire supported by the plurality of first support arms for supporting fruiting canes so that, after the fruiting canes are severed, the grapes can dry from the heat of the sun to create raisins; and a second wire supported by the plurality of second support arms for supporting replacement canes so that the replacement canes are separated from the fruiting canes.

2. The system according to claim 1 wherein the inner ends of the first support arms are aligned with the row of vines.

3. The system according to claim 1 wherein each said second support member includes a substantially vertical post having lower and upper ends, the lower end being mounted in the ground, the post being aligned with the row of vines.

4. The system according to claim 3 wherein each said second support arm is mounted to the upper end of the post.

5. The system according to claim 4 wherein each said second support arm is centered on the post.

6. The system according to claim 1 wherein each said second support arm is U-shaped with the elevations of the first and second ends being the same.

7. The system according to claim 1 wherein the first support arms extend in a generally north-south direction.

8. The system according to claim 1 wherein the first support arms outnumber the second support arms by a ratio of at least 2 to 1.

9. A trellis system for producing dried-on-the-vine raisins in a row of vines of the type growing in the ground and having a split canopy of fruiting canes and replacement canes, the system comprising:

a plurality of first support arms each having outer and inner ends;

a plurality of second support arms each having first and second ends;

first means for supporting each said first support arm along the row of vines with the outer end having an upper elevation and the inner end having a lower elevation, the upper elevation being substantially greater than the lower elevation;

second means for supporting each said second support arm along the row of vines with the first and second ends both having elevations higher than the upper elevation;

each said first support arm having an extension extending from the inner end of the first support arm to an extended end, the extended end having an elevation lower than the lower elevation of the inner end;

a first wire supported by the plurality of first support arms for supporting fruiting canes so that, after the fruiting canes are severed, the grapes can dry from the heat of the sun to create raisins; and a second wire supported by the plurality of second support arms for supporting replacement canes so that the replacement canes are separated from the fruiting canes.

10. The system according to claim 9 wherein the first means for supporting includes a substantially vertical post having upper and lower ends, the lower end being mounted into the ground.

11. The system according to claim 10 wherein the inner end of each said first support arm is mounted to the post at a position spaced apart from and between the upper and lower ends of the post.

12. The system according to claim 11 wherein the position is approximately halfway between the upper and lower ends.

13. The system according to claim 11 wherein the means for supporting each said first support arm includes a third wire connected to the extended end and the post.

14. A trellis system for producing dried-on-the-vine raisins in a row of vines of the type growing in the ground and having a split canopy of fruiting canes and replacement canes, the system comprising:

a plurality of first support arms each having upper and lower portions and a curved middle portion, the lower portion being substantially vertical and mounted into the ground, the upper portion being upwardly inclined with respect to the lower portion so that the upper portion extends upward and outward from the curved middle portion;

a plurality of second, U-shaped support arms each having first and second ends;

a plurality of substantially vertical posts each having upper and lower ends, the upper ends supporting the second support arms above the upper portions of the first support arms and the lower ends being mounted into the ground;

a first wire supported by the upper portions of the plurality of first support arms for supporting fruiting canes so that, after the fruiting canes are severed, the grapes can dry from the heat of the sun to create raisins; and a second wire supported by the plurality of second support arms for supporting replacement canes so that the replacement canes are separated from the fruiting canes.

15. A trellis system for producing dried-on-the-vine raisins in a row of vines of the type growing in the ground and having a split canopy of fruiting canes and replacement canes, the system comprising:

a plurality of first support arms each having outer and inner ends and a connection point between the outer and inner ends;

a plurality of substantially vertical posts aligned with the row of vines each having upper and lower ends and a connection position spaced apart from and between the upper and lower ends, the lower ends being mounted into the ground;

the connection point of each of the first support arms being mounted to the connection position of a corresponding vertical post with the outer end having an upper elevation and the lower end having a lower elevation, the upper elevation being substantially greater than the lower elevation;

a plurality of second support arms each having first and second ends, the second support arms being mounted to the upper ends of the posts with the first and second ends both having elevations higher than the upper elevation;

a first wire connected to the inner ends and the vertical posts;

a second wire supported by the plurality of first support arms for supporting fruiting canes so that, after the fruiting canes are severed, the grapes can dry from the heat of the sun to create raisins; and a third wire supported by the plurality of second support arms for supporting replacement canes so that the replacement canes are separated from the fruiting canes.

* * * * *